United States Patent
Raissinia et al.

(10) Patent No.: US 9,819,750 B2
(45) Date of Patent: Nov. 14, 2017

(54) NEIGHBOR AWARE NETWORK CLUSTER TOPOLOGY ESTABLISHMENT BASED ON PROXIMITY MEASUREMENTS

(71) Applicant: QUALCOMM Incorporated, San Diego, CA (US)

(72) Inventors: Alireza Raissinia, Monte Sereno, CA (US); Santosh Paul Abraham, San Diego, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/715,324

(22) Filed: May 18, 2015

(65) Prior Publication Data
US 2015/0350027 A1    Dec. 3, 2015

Related U.S. Application Data

(60) Provisional application No. 62/007,313, filed on Jun. 3, 2014.

(51) Int. Cl.
| | |
|---|---|
| H04L 29/08 | (2006.01) |
| H04L 12/24 | (2006.01) |
| H04B 17/318 | (2015.01) |
| H04W 4/02 | (2009.01) |
| H04W 52/38 | (2009.01) |
| H04W 56/00 | (2009.01) |
| H04W 8/00 | (2009.01) |

(Continued)

(52) U.S. Cl.
CPC ........... *H04L 67/16* (2013.01); *H04B 17/318* (2015.01); *H04L 41/12* (2013.01); *H04W 4/023* (2013.01); *H04W 8/005* (2013.01); *H04W 52/383* (2013.01); *H04W 56/0015* (2013.01); *H04W 52/00* (2013.01); *H04W 84/20* (2013.01)

(58) Field of Classification Search
CPC ..... H04W 84/00; H04W 84/10–84/18; H04W 4/023; H04W 8/005; H04W 52/00; H04W 52/383; H04W 56/0015; H04W 84/20; H04L 41/12; H04L 67/16; H04B 17/318
USPC ................................ 455/518, 519, 41.2, 517
See application file for complete search history.

(56) References Cited

U.S. PATENT DOCUMENTS

| | | | |
|---|---|---|---|
| 2002/0122405 A1* | 9/2002 | Liang | H04W 16/14 370/344 |
| 2003/0078062 A1* | 4/2003 | Burr | H04W 56/002 455/502 |

(Continued)

FOREIGN PATENT DOCUMENTS

WO     2009158663 A1     12/2009

OTHER PUBLICATIONS

Daniel C M., et al., "Enabling always on service discovery: Wifi neighbor awareness networking", IEEE Wireless Communications, Apr. 2015, pp. 118-125, 1536-1284.

(Continued)

*Primary Examiner* — Raymond Dean
(74) *Attorney, Agent, or Firm* — Toler Law Group, PC.

(57) ABSTRACT

A method includes determining, at a first device of a neighbor aware network (NAN), a proximity of the first device to a second device of the NAN. The method further includes determining whether to change a NAN operating mode of the first device based on the proximity.

31 Claims, 6 Drawing Sheets

(51) Int. Cl.
*H04W 84/20* (2009.01)
*H04W 52/00* (2009.01)

(56) References Cited

U.S. PATENT DOCUMENTS

| | | | | |
|---|---|---|---|---|
| 2004/0109417 A1* | 6/2004 | Castro | ................ | H04L 67/104 370/238 |
| 2009/0124243 A1* | 5/2009 | Routley | ............ | H04M 1/72572 455/418 |
| 2012/0096186 A1* | 4/2012 | Chang | ................ | H04L 67/104 709/248 |
| 2013/0034023 A1* | 2/2013 | Jung | ................ | H04L 67/104 370/255 |
| 2014/0213193 A1* | 7/2014 | Zhang | ................ | G01S 11/02 455/67.11 |
| 2014/0357192 A1* | 12/2014 | Azogui | ................ | H04B 7/26 455/41.2 |
| 2015/0139213 A1* | 5/2015 | Abraham | ................ | H04L 69/28 370/338 |

OTHER PUBLICATIONS

International Search Report and Written Opinion—PCT/US2015/031636—ISA/EPO—dated Sep. 1, 2015.
Kifayat K., et al., "An Efficient Multi-Parameter Group Leader Selection Scheme for Wireless Sensor Networks", Network and Service Security, 2009 ESRGroups France, pp. 1-5.
Ping W X., et al., "Two approaches for resolving number limitations of the equipments connected in Bluetooth communication", IEEEI 2011, 3 pages.

* cited by examiner

NEIGHBOR AWARE NETWORK CLUSTER TOPOLOGY ESTABLISHMENT BASED ON PROXIMITY MEASUREMENTS

I. CROSS REFERENCE TO RELATED APPLICATIONS

The present application claims priority from U.S. Provisional Patent Application No. 62/007,313, filed Jun. 3, 2014 and entitled "NEIGHBOR AWARE NETWORK CLUSTER TOPOLOGY ESTABLISHMENT BASED ON PROXIMITY MEASUREMENTS," the content of which is incorporated herein in its entirety.

II. FIELD

The present disclosure is generally related to neighbor aware network (NAN) cluster topology establishment at devices based on proximity measurements.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data or to exchange information. For example, mobile electronic devices that are in close proximity to each other may use a neighbor aware network (NAN) to perform data exchanges via the NAN (e.g., without involving wireless carriers, Wi-Fi access points, and/or the Internet). To enable functionality of the NAN, a particular electronic device may operate as an "anchor master" device (e.g., operate in a particular NAN operating mode referred to as an anchor master device operating mode) and may provide timing information as well as announce attributes of the NAN to other devices in a first group (e.g., subset) of devices of a NAN cluster (e.g., one or more groups of devices in the NAN). In order to expand the NAN beyond the first group, one or more of the devices in the first group may operate as a "NAN master" device (e.g., operate in another particular NAN operating mode referred to as a master device operating mode). Devices operating as NAN master devices propagate the timing information received from the anchor master device and announce attributes of the NAN to other devices beyond the first group, thereby extending the range of the NAN cluster beyond devices within close proximity of the anchor master device. Other devices within the NAN operating as "non-master" devices (e.g., devices operating in NAN operating modes referred to as non-master operating modes) are able to receive the timing information and to use the NAN when the devices are located within the NAN cluster.

Each device within the NAN may operate in the anchor master device operating mode, in the NAN master device operating mode, or in the non-master device operating mode. According to a NAN standard, a device determines whether to operate in the master device operating mode based on a received signal strength indicator (RSSI) associated with a transmission from an anchor master device or from a master device. Because communication signals (e.g., transmissions) can be affected by fading and temporary blockages (e.g., a moving object located temporarily between two devices), a device may change a NAN operating mode from the non-master device operating mode to the master device operating mode based on a temporary condition, thus increasing power consumption at the device. In addition, the device may increase signaling within the NAN when the device operates in the master device operating mode and may potentially degrade performance of the NAN. For example, devices operating in the NAN may have less chance to transmit and/or to receive service discovery frames due to the increased signaling from the device operating in the master device operating mode.

IV. SUMMARY

The present disclosure is directed to systems and methods to enable devices in a neighbor aware network (NAN) to determine whether to change NAN operating modes based on proximity to other devices. By enabling devices to change NAN operating modes based on proximity, an improved NAN topology (e.g., a topology associated with reduced power consumption at one or more devices and/or reduced network traffic in the NAN) may be established as compared to a NAN topology established by devices that change NAN operating modes based only on signal strength measurements.

In the present disclosure, a device in a NAN may receive a beacon message, such as a discovery beacon message or a synchronization beacon message, from a "master device" (e.g., a device operating in a master operating mode) of the NAN. The beacon message may indicate a particular time period and one or more proximity thresholds. The device may initiate performance of one or more proximity operations with the master device during the particular time period to determine a proximity of the device to the master device. In a particular aspect, the one or more proximity operations may include fine timing measurement (FTM) operations. After determining the proximity, the device may determine whether to change a NAN operating mode of the device based on the proximity. For example, if the proximity exceeds a first proximity threshold of the one or more proximity thresholds, the device may change the NAN operating mode from a non-master device operating mode to a master device operating mode. As another example, after changing the NAN operating mode to the master device operating mode, if the proximity fails to exceed the first proximity threshold, the device may change the NAN operating mode of the device from the master device operating mode to the non-master device operating mode.

Changing the NAN operating mode of the device from the non-master device operating mode to the master device operating mode enables the device to propagate timing information and other information to other devices, thereby expanding a NAN cluster (e.g., one or more groups of devices in the NAN). For example, the NAN cluster may be expanded by including additional devices and/or services in the NAN cluster. Changing the NAN operating mode of the device from the master device operating mode to the non-master device operating mode enables the device to reduce power consumption. In other aspects, the device may determine to change the NAN operating mode of the device based on the proximity and based on a received signal strength indicator (RSSI) associated with the beacon message. Using both the proximity and the RSSI in the determination process may reduce a likelihood of the device changing the NAN operating mode based on temporary disruptions to communication signals. Additionally, the device may provide data indicating the proximity to the master device to enable the master device to modify one or more attributes of a service provided to the device based on the proximity.

In a particular aspect, a method includes determining, at a first device of a neighbor aware network (NAN), a proximity of the first device to a second device of the NAN. The method further includes determining whether to change a NAN operating mode of the first device based on the proximity.

In another particular aspect, an apparatus includes a processor and a memory coupled to the processor. The memory stores instructions that are executable by the processor to perform operations including determining, at a first device of a neighbor aware network (NAN), a proximity of the first device to a second device of the NAN. The operations further include determining whether to change a NAN operating mode of the first device based on the proximity.

In another particular aspect, an apparatus includes means for determining, at a first device of a neighbor aware network (NAN), a proximity of the first device to a second device of the NAN. The apparatus further includes means for determining whether to change a NAN operating mode of the first device based on the proximity.

In another particular aspect, a non-transitory computer readable medium includes instructions that, when executed by a processor, cause the processor to determine, at a first device of a neighbor aware network (NAN), a proximity of the first device to a second device of the NAN. The instructions further cause the processor to determine whether to change a NAN operating mode of the first device based on the proximity.

One advantage provided by at least one of the disclosed aspects is a reduction in power consumption and a reduction in network signaling (e.g., traffic or congestion) in a NAN. For example, a device may determine whether to change a NAN operating mode based on a proximity to a master device. Because the determination is based on proximity (instead of only based on RSSI), if fading or other factors (e.g., an object moving between the device and the master device) causes a temporary decrease to RSSI, the device does not change a NAN operating mode to a master device operating mode based on a temporary condition. By remaining in a non-master device operating mode, as compared to changing to the master device operating mode, the device consumes less power and does not contribute additional signal traffic to the NAN.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

VI. DETAILED DESCRIPTION

Particular aspects of the present disclosure are described below with reference to the drawings. In the description, common features are designated by common reference numbers throughout the drawings.

Figure 1:
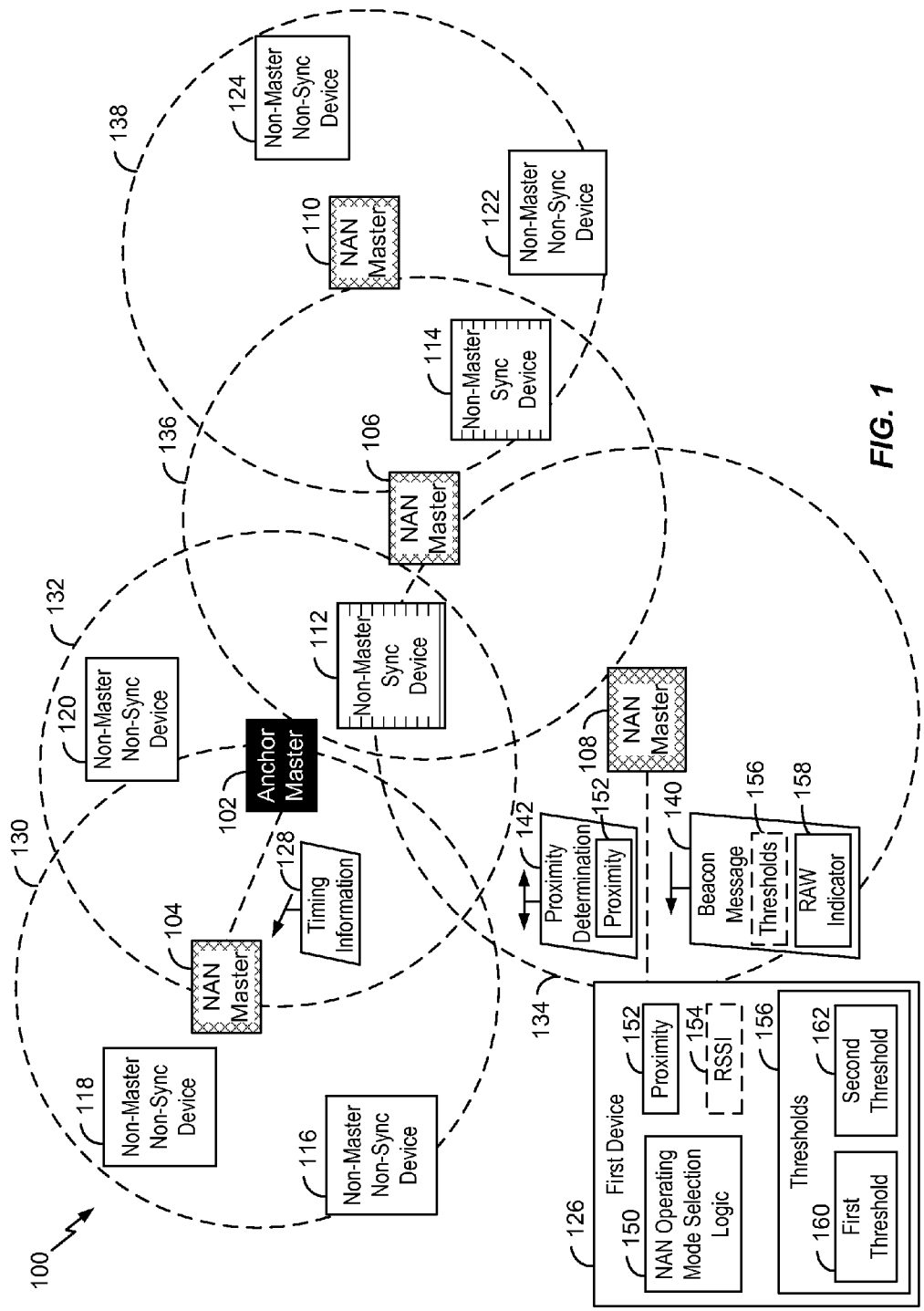
FIG. 1 is a diagram of a particular aspect of a system that includes a neighbor aware network (NAN) that includes one or more devices configured to determine whether to change respective NAN operating modes based on proximity to other devices.

Referring to FIG. 1, a particular aspect of a system 100 that includes a neighbor aware network (NAN) that includes one or more devices configured to determine whether to change respective NAN operating modes based on proximity to other devices is shown. One or more electronic devices may be part of the NAN (e.g., a NAN cluster). Devices of the NAN may be configured to perform data exchanges via wireless communications between devices of the NAN (e.g., without involving wireless carriers, wireless fidelity ("wi-fi") access points, and/or the Internet). Additionally, one or more devices of the NAN may be included in one or more "data path groups" or "NAN datalinks." A data path group or a NAN datalink refers to a subset of a NAN that shares one or more services via one or more particular wireless channels and that share a type of data announcement and one or more common security credentials. In some implementations, the data path group or the NAN datalink may form a peer-to-peer, infrastructure-less, ad-hoc wireless network. In a particular implementation, the data path group or the NAN datalink may be a social wireless mesh network (a "social wi-fi mesh").

In FIG. 1, the NAN includes "anchor master" device 102, "NAN master" devices 104-110, "non-master sync" devices 112 and 114, "non-master non-sync" devices 116-124, and a first device 126. As referred to herein, types of NAN devices refer to NAN operating modes of the devices. For example, a NAN master device refers to a device of a NAN that is operating in a NAN master operating mode. Each of the devices 102-126 may be capable of operating in different NAN operating modes at different times, and the devices 102-126 may switch from operating in one NAN operating mode to operating in another NAN operating mode at particular times, as further described herein. The system 100 is illustrated for convenience only and is not limiting. For example, in other aspects the system 100 may include any number or type of NAN devices (e.g., devices operating in any NAN operating mode) at any locations.

The devices 102-126 may be fixed electronic devices or mobile electronic devices. For example, the devices 102-126 may include or correspond to mobile phones, laptop computers, tablet computers, multimedia devices, peripheral devices, data storage devices, or a combination thereof. Additionally or alternatively, the devices 102-126 may include a processor (e.g., a central processing unit (CPU), a digital signal processor (DSP), a network processing unit (NPU), etc.), a memory (e.g., a random access memory (RAM), a read-only memory (ROM), etc.), and/or a wireless interface configured to send and receive data via the NAN, as described further with reference to FIG. 8.

The devices 102-126 may exchange data and/or services via the NAN. The devices 102-126 of the NAN may operate in accordance with wireless protocols and/or standards, such as an Institute of Electrical and Electronics Engineers (IEEE) 802.11 standard. For example, the devices 102-126 of the NAN may operate in accordance with an IEEE 802.11a, b, g, n, aa, ac, ad, ae, af, or mc standard. Additionally, the devices 102-126 of the NAN may operate in accordance with a different wireless protocol or standard, such as a Wi-Fi Alliance standard or another NAN standard. Additionally, one or more of the devices 102-126 may be configured to communicate with a cellular network via one or more cellular communication protocols and/or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, etc.

Each of the devices 102-126 may enter and exit the NAN at various times during operation. While in the NAN, the devices 102-126 may communicate wirelessly with other devices in the NAN. As further described with reference to FIG. 8, the devices 102-126 may include at least one wireless receiver and at least one wireless transmitter configured to communicate wirelessly among the devices 102-126. Although certain operations described herein may be described with reference to a "receiver" or a "transmitter," in other implementations a transceiver may perform both data receiving and data transmitting operations.

As illustrated in FIG. 1, the NAN cluster includes groups 130-138 formed by the anchor master device 102 and the NAN master devices 104-110, respectively. Each of the groups 130-138 may represent an area of coverage of the corresponding device (e.g., the anchor master device 102 or the NAN master devices 104-110) and may be associated with a particular "hop range" from the anchor master device 102. For example, a first group 132 represents a "one-hop" range from the anchor master device 102, and devices within the first group 132 may be able to receive wireless communication signals from the anchor master device 102. As another example, a second group 130, a third group 134, and a fourth group 136 represent a "two-hop" range from the anchor master device 102, and devices within the second group 130, the third group 134, and the fourth group 136 may be able to receive wireless communication signals from NAN master device 104, NAN master device 108, and NAN master device 106, respectively. As another example, a fifth group 138 represents a "three-hop" range from the anchor master device 102, and devices within the fifth group 138 may be able to receive wireless communication signals from NAN master device 110.

The anchor master device 102 is a device of the NAN that is operating in an anchor master device operating mode. In some implementations, devices determine whether to operate in the anchor master device operating mode in accordance with a NAN standard. For example, at an initial time the anchor master device 102 may begin operating in the anchor device operating mode and performing one or more anchor master device operations. After a particular time period expires, the anchor master device 102 may change a NAN operating mode from the anchor master device operating mode to another NAN operating mode, and a different device of the NAN (e.g., one of the devices 104-126) may begin operating in the anchor master operating mode, in accordance with the NAN standard. Thus, different devices of the NAN may perform the anchor master device operations (e.g., operate in the anchor master device operating mode) during different time periods, in accordance with the NAN standard.

The anchor master device 102 may be configured, while operating in the anchor master device operating mode, to provide timing information 128 (e.g., operate as a clock source) to other devices in the NAN. The timing information 128 may be used by the other devices (e.g., the devices 104-126) to synchronize internal clocks of the other devices. For example, the anchor master device 102 may provide the timing information 128 to the NAN master device 104 within the first group 132, and the NAN master device 104 may synchronize a respective internal clock based on the timing information 128 so that the NAN master device 104 and the anchor master device 102 may perform wireless communications at synchronized times. Although the timing information 128 is illustrated in FIG. 1 as being provided only to the NAN master device 104, the timing information 128 may be provided to each device within range of the anchor master device 102. Additionally, the anchor master device 102 may provide a service announcement in a message that includes the timing information 128. The service announcement may indicate services available within the first group 132. The anchor master device 102 may also provide signaling to enable other devices to join the NAN via the first group 132 and to perform proximity determination operations, as further described herein.

The NAN master devices 104-110 may receive the timing information 128 from the anchor master device 102 or from another master device and may propagate the timing information 128 to other devices in corresponding groups. For example, the NAN master device 104 may receive the timing information 128 from the anchor master device 102 and may provide the timing information 128 to non-master non-sync devices 116-120 in the second group 130. Additionally, the NAN master devices 104-110 may provide signaling, such as discovery beacons that indicate a time that an upcoming discovery window and/or discovery period will begin and that indicate services available within respective groups. For example, the NAN master device 104 may announce services available within the second group 130. Thus, the NAN master devices 104-110 (e.g., devices operating in the NAN master device operating mode) extend the NAN cluster by adding additional groups (e.g., groups 130 and 134-138). Devices may determine whether to operate in the NAN master device operating mode based on proximity to other devices, as further described herein.

Non-master (e.g., non-master sync devices 112 and 114 and non-master non-sync devices 116-124) may be located within one or more of the groups 130-138 of the NAN and may be configured to communicate with other devices in the NAN to use one or more services provided by the NAN. The non-master sync devices 112 and 114 may provide the timing information 128 from the anchor master device 102 or from one of the NAN master devices 104-110 to other devices without providing the other signaling (e.g., the discovery beacons) or announcing services of the NAN, thereby reducing power consumption at the non-master sync devices 112 and 114 as compared to the NAN master devices 104-110. The non-master non-sync devices 116-124 may not provide the timing information 128 or the other signaling. If the non-master non-sync devices 116-124 determine that no available service of the NAN is to be used at a particular time, the non-master non-sync devices 116-124 may enter a sleep mode to conserve power. After a particular sleep time period, the non-master non-sync devices 116-124 may exit the sleep mode (e.g., "wake up") and determine whether any available service of the NAN is to be used, for example by an application running at the non-master non-sync devices 116-124. If an available service is to be used, the non-master non-sync devices 116-124 may perform one or more wireless communications via the NAN. If the non-master non-sync devices 116-124 determine that no available service of the NAN is to be used, the non-master non-sync devices 116-124 may re-enter the sleep mode. Devices may determine whether to operate as non-master devices (e.g., operate in a non-master device operating mode) based on proximity to other devices, as further described herein. As used herein, the non-master device operating mode may be a non-master sync device operating mode or a non-master non-sync device operating mode.

The first device 126 may be a NAN-enabled device configured to set a NAN operating mode in one of the previously-described NAN device operating modes upon entering the NAN. To enable selection and changing of the NAN operating mode, the first device 126 may include NAN operating mode selection logic 150 that is configured to select the NAN operating mode of the first device 126 based only on proximity data 152, or based on the proximity data 152 and a received signal strength indicator (RSSI) 154, as further described herein. Each of the devices 102-124 may include corresponding NAN operating mode selection logic (not illustrated) similarly configured to the NAN operating mode selection logic 150. Accordingly, each of the devices 102-126 may select or change NAN operating modes based on only on proximity data, or based on the proximity data and RSSI data, as further described herein.

During operation, the NAN master device 108 may generate and transmit a beacon message 140. In a particular implementation, the beacon message 140 may be a discovery beacon message. In another implementation, the beacon message 140 may be a synchronization beacon message. The beacon message 140 may include one or more proximity thresholds 156 and a ranging availability window (RAW) indicator 158. As used herein, a ranging availability window (RAW) refers to a time period reserved by the NAN master device 108 for performing proximity determination operations. The RAW indicator 158 may identify when a RAW is to occur. For example, the RAW indicator 158 may identify when a RAW occurs relative to an upcoming discovery window in the NAN. In another particular implementation, the NAN master device 108 may adapt (e.g., modify) a size of the RAW based on an estimated number of devices to perform proximity determination operations with. For example, the NAN master device 108 may determine a number of other devices that request proximity determination operations during a first RAW. When the number of other devices exceeds a threshold number of devices, the NAN master device 108 may increase a duration of a next scheduled RAW. When the number of other devices fails to exceed the threshold number of devices, the NAN master device 108 may decrease the duration of a next scheduled RAW. In another particular implementation, the one or more proximity thresholds 156 may be indicated by a ranging attribute (RA) field of the beacon message 140. The one or more proximity thresholds 156 may be indicated by a particular parameter of the RA field that is associated with a default value in a NAN standard.

The first device 126 may receive the beacon message 140 and may store the one or more proximity thresholds 156 and the RAW indicator 158 in a memory. To determine a proximity of the first device 126 to the NAN master device 108, the first device 126 may initiate performance of proximity determination operations 142 with the NAN master device 108 during the RAW indicated by the RAW indicator 158. In a particular implementation, the beacon message 140 may also indicate that the NAN master device 108 will operate as a "responder" during the RAW, and that other devices are to operate as "initiators" during the RAW. In another implementation, the first device 126 and the NAN master device 108 may be pre-programmed to operate as an initiator when determining a proximity to another device and to operate as a responder after transmitting a beacon message indicating the RAW.

In a particular implementation, the proximity determination operations 142 may include performing fine timing measurements (FTMs) between the first device 126 and the NAN master device 108. A FTM process between the first device 126 and the NAN master device 108 may include a 6-way frame exchange between the first device 126 and the NAN master device 108. In a particular example, the first device 126 initiates the FTM process by transmitting a FTM request to the NAN master device 108. The first device 126 transmits the FTM request during the RAW indicated by the RAW indicator 158. The FTM request may include an "as soon as possible" (ASAP) field indicating that the first device 126 requests the FTM process to proceed as soon as possible at the NAN master device 108. In response to receiving the FTM request, the NAN master device 108 transmits a first acknowledgement (ACK) to the first device 126. After transmission and reception of the first ACK, the NAN master device 108 generates and transmits a first FTM response to the first device 126. The NAN master device 108 captures a first time t1 (e.g., a first timestamp) at which the first FTM response is transmitted using a partial timing synchronization function (TSF) timer of the NAN master device 108. The first device 126 receives the first FTM response and captures a second time t2 (e.g., a second timestamp) at which the first FTM response is received using a partial TSF timer of the first device 126. In a particular implementation, a time period between the second time t2 and a time at which the first device 126 transmits the FTM request does not exceed 10 milliseconds (ms).

The first device 126 sends a second ACK to the NAN master device 108 and determines a third time t3 (e.g., a third timestamp) at which the second ACK is transmitted. The NAN master device 108 receives the second ACK from the first device 126 and determines a fourth time t4 (e.g., a fourth timestamp) at which the second ACK is received. Based on receipt of the second ACK, the NAN master device 108 sends a second FTM response to the first device 126. The second FTM response includes data indicating the first time t1 and the fourth time t4 (e.g., the first timestamp and the fourth timestamp) determined at the NAN master device 108. The first device 126 receives the second FTM response from the NAN master device 108 and transmits a third ACK to the NAN master device 108. Additionally, the first device 126 calculates a round trip time (RTT) value using the formula (t4−t1)−(t3−t2). In a particular implementation, the first device 126 may use the RTT value to indicate a proximity measurement. In another implementation, the first device 126 may convert the RTT value to a distance in order to determine a proximity measurement. For example, the first device 126 may convert the RTT value to a proximity measurement in feet or meters. Although determining the proximity measurement has been described as including a single FTM operation (e.g., the six-frame exchange), in other implementations, determining the proximity measurement may include multiple FTM operations to enable increased accuracy.

After determining the proximity measurement indicating the proximity of the first device 126 to the NAN master device 108, the first device 126 may store the proximity measurement as proximity data 152. The first device 126 may select or change a NAN operating mode of the first device 126 based on the proximity data 152. The NAN operating mode selection logic 150 may determine whether to change the NAN operating mode. For example, the NAN operating mode selection logic 150 may be configured to change the NAN operating mode of the first device 126 between the master device operating mode and the non-master device operating mode based on the proximity data 152. When the first device 126 is operating in the master device operating mode, the first device 126 may terminate one or more master device operations prior to changing the NAN operating mode to the non-master device operating mode. Additionally, when the first device 126 is operating in the non-master device operating mode, the first device 126 may initiate one or more master device operations subsequent to changing the NAN operating mode to the master device operating mode. Accordingly, the first device 126 may perform the one or more master device operations when operating in the master device operating mode and may refrain from performing the one or more master device operations when operating in the non-master device operating mode.

In a particular implementation, the NAN operating mode selection logic 150 may determine whether to change the NAN operating mode of the first device 126 based only on the proximity data 152, and not based on signal strength measurements. In this implementation, determining whether to change the NAN operating mode may be based on comparing of the proximity data 152 to the one or more proximity thresholds 156. In some implementations, the one or more proximity thresholds 156 may be included in the beacon message 140 received from the NAN master device 108. In other implementations, the one or more proximity thresholds 156 may be pre-programmed and stored at the first device 126. The one or more proximity thresholds 156 may include a first proximity threshold 160 ("tclose") and a second proximity threshold 162 ("tmedium"). The second proximity threshold 162 (tmedium) may be greater than the first proximity threshold 160 (tclose). The one or more proximity thresholds 156 (e.g., the first proximity threshold 160 and the second proximity threshold 162) may be used as metrics by the NAN operating mode selection logic 150 in selecting the NAN operating mode of the first device 126.

The NAN operating mode selection logic 150 may determine whether the proximity of the first device 126 to one NAN master device (e.g., the NAN master device 108) exceeds the first proximity threshold 160 (tclose). When the proximity fails to exceed the first proximity threshold 160, the NAN operating mode selection logic 150 may set the NAN operating mode of the first device 126 to the non-master device operating mode. For example, when the first device 126 is operating in the non-master device operating mode and the proximity fails to exceed the first proximity threshold 160, the NAN operating mode selection logic 150 may maintain the NAN operating mode in the non-master device operating mode. As another example, when the first device 126 is operating in the master device operating mode and the proximity fails to exceed the first proximity threshold 160, the NAN operating mode selection logic 150 may change the NAN operating mode from the master device operating mode to the non-master device operating mode. When the proximity exceeds the first proximity threshold 160, the NAN operating mode selection logic 150 may set the NAN operating mode of the first device 126 to the master device operating mode. For example, when the first device 126 is operating in the non-master device operating mode and the proximity exceeds the first proximity threshold 160, the NAN operating mode selection logic 150 may change the NAN operating mode from the non-master device operating mode to the master device operating mode. As another example, when the first device 126 is operating in the master device operating mode and the proximity exceeds the first proximity threshold 160, the NAN operating mode selection logic 150 may maintain the NAN operating mode in the master device operating mode.

The NAN operating mode selection logic 150 may also determine whether to change the NAN operating mode based on whether a proximity of the first device 126 to at least three NAN master devices exceeds the second proximity threshold 162 (tmedium). For example, the first device 126 may determine a proximity to three NAN master devices, as further described with reference to FIG. 2. When the proximity of the first device 126 to the three other devices exceeds the first proximity threshold 160 and fails to exceed the second proximity threshold 162, the NAN operating mode selection logic 150 may set the NAN operating mode of the first device 126 to the non-master device operating mode. For example, the NAN operating mode selection logic 150 may maintain the NAN operating mode in the non-master device operating mode when the first device 126 is operating in the non-master device operating mode, and may change the NAN operating mode from the master device operating mode to the non-master device operating mode when the first device 126 is operating in the master device operating mode. When the proximity of the first device 126 to the three other devices exceeds the second proximity threshold 162, the NAN operating mode selection logic 150 may set the NAN operating mode of the first device 126 to the master device operating mode. For example, the NAN operating mode selection logic 150 may maintain the NAN operating mode in the master device operating mode when the first device 126 is operating in the master device operating mode, and may change the NAN operating mode from the non-master device operating mode to the master device operating mode when the first device 126 is operating in the non-master device operating mode.

In a particular implementation, when the first device 126 is operating in the non-master non-sync device operating mode, the NAN operating mode selection logic 150 may determine whether to change the NAN operating mode of the first device 126 from the non-master non-sync device operating mode (e.g., a first non-master device operating mode) to the non-master sync-device operating mode (e.g., a second non-master device operating mode) based on received sync beacons. The first device 126 may be configured to determine proximity of the first device 126 to other devices from which the first device 126 receives sync beacons and to compare the proximities to the first proximity threshold 160 (tclose) and to the second proximity threshold 162 (tmedium).

When all received sync beacons are received from devices farther away than the first proximity threshold 160, the NAN operating mode selection logic 150 may change the NAN operating mode from the non-master non-sync device operating mode to the non-master sync device operating mode. Thus, the first device 126 may begin functioning as a non-master sync device when no neighboring non-master sync device is within the first proximity threshold 160. The first device 126 may also begin functioning as a non-master sync device when fewer than three neighboring non-master sync devices are farther away than the first proximity threshold 160 but within the second proximity threshold 162. The first device 126 may switch from operating in the non-master sync device operating mode to the non-master non-sync device operating mode in the opposite conditions (i.e., when the first device 126 is within the first proximity threshold 160 of a neighboring non-master sync device, or when the first device 126 is between the first proximity threshold 160 and the second proximity threshold 162 away from at least three neighboring non-master sync devices).

In another particular implementation, the NAN operating mode selection logic 150 may determine whether to change the NAN operating mode of the first device 126 based on the proximity data 152 and based on received signal strength measurements. In this implementation, the first device 126 may determine a received signal strength indicator (RSSI) 154 associated with the beacon message 140 received from the NAN master device 108. The NAN operating mode selection logic 150 may determine whether to change the NAN operating mode of the first device 126 based on the RSSI 154, for example, by comparing the RSSI 154 to one or more signal strength thresholds in a similar manner to comparing the proximity (indicated by the proximity data 152) to the one or more proximity thresholds 156. For example, the NAN operating mode selection logic 150 may determine whether to change the NAN operating mode of the first device 126 from the master device operating mode to the non-master device operating mode based on the proximity data 152 and based on the RSSI 154. As another example, the NAN operating mode selection logic 150 may determine whether to change the NAN operating mode of the first device 126 from the non-master device operating mode to the master device operating mode based on the proximity data 152 and based on the RSSI 154

In a particular implementation, determining whether to change the NAN operating mode of the first device 126 based on the proximity (indicated by the proximity data 152) may occur prior to determining whether to change the NAN operating mode of the first device based on the RSSI 154. In this implementation, the NAN operating mode selection logic 150 may perform determinations using the proximity as a higher priority metric than the RSSI 154. For example, the NAN operating mode selection logic 150 may determine whether to change the NAN operating mode based on the RSSI 154 only when a determination whether to change the NAN operating mode based on the proximity (indicated by the proximity data 152) results in determining to change the NAN operating mode.

In another particular implementation, determining whether to change the NAN operating mode of the first device 126 based on the proximity (indicated by the proximity data 152) may occur subsequent to determining whether to change the NAN operating mode of the first device based on the RSSI 154. In this implementation, the NAN operating mode selection logic 150 may perform determinations using the RSSI 154 as a higher priority metric than the proximity. For example, the NAN operating mode selection logic 150 may determine whether to change the NAN operating mode based on the proximity (indicated by the proximity data 152) only when a determination whether to change the NAN operating mode based on the RSSI 154 results in a determining change the NAN operating mode. Changing the NAN operating mode of the first device 126 based on two metrics (e.g., the proximity and the RSSI 154) may establish an improved NAN cluster topology as compared to changing the NAN operating mode based on a single metric. Selection of the metric (e.g., the proximity or the RSSI 154) to be used as the higher priority metric may be based on design considerations. For example, use of the proximity as the higher priority metric may result in an improved NAN cluster topology due to increased accuracy of the proximity measurements, as compared to use of the RSSI 154 as the higher priority metric, which may reduce overhead associated with performing the proximity determination operations 142.

Additionally or alternatively, the NAN operating mode of the first device 126 may be changed from the non-master device operating mode to the master device operating mode based on a first metric, and the NAN operating mode may be changed from the master device operating mode to the non-master device operating mode based on a second metric. In a particular implementation, the NAN operating mode selection logic 150 may determine whether to change the NAN operating mode from the non-master device operating mode to the master device operating mode based on the RSSI 154. In this implementation, the NAN operating mode selection logic 150 may determine whether to change the NAN operating mode from the master device operating mode to the non-master device operating mode based on the proximity (indicated by the proximity data 152). In another particular implementation, the NAN operating mode selection logic 150 may determine whether to change the NAN operating mode from the non-master device operating mode to the master device operating mode based on the proximity (indicated by the proximity data 152). In this implementation, the NAN operating mode selection logic 150 may determine whether to change the NAN operating mode from the master device operating mode to the non-master device operating mode based on the RSSI 154.

After determining whether to change NAN operating modes, or during the determination process, the first device 126 may transmit the proximity data 152 to the NAN master device 108. For example, the proximity data 152 may be transmitted to the NAN master device 108 during the proximity determination operations 142. In a particular implementation, the NAN master device 108 may adjust a service provided to the first device 126 based on the proximity data 152. For example, the NAN master device 108 may provide audio to the first device 126. The NAN master device may adjust an attribute of the audio, such as a volume associated with the audio or a delay associated with the audio, based on the proximity data 152.

Because the devices 102-126 determine whether to change NAN operating modes based on proximity to NAN master devices or anchor master devices, the system 100 may have an improved NAN cluster topology as compared to a NAN that includes devices that change NAN operating modes based only on received signal strength. For example, communication signals between two devices may be temporarily disrupted, and signal strength reduced, when an object moves between the two devices. If a device determines whether to change the NAN operating mode based only on received signal strength, the device may change the NAN operating mode to the master device operating mode, thus consuming increased power. However, devices of the system 100 may refrain from changing the NAN operating mode to the master device mode based on the proximity, thus consuming less power. As another example, a particular device may receive a transmission from a NAN master device with a signal strength that exceeds a signal strength threshold, but neighboring devices of the particular device may receive the transmission with reduced signal strength due to fading or other factors. An improved NAN cluster topology may result from the particular device changing to the master operating mode based on a proximity instead of remaining in the non-master operating mode based on the signal strength. Additionally, devices that determine whether to change NAN operating modes based on two metrics (e.g., proximity and signal strength) instead of a single metric may further improve the NAN cluster topology.

Figure 2:
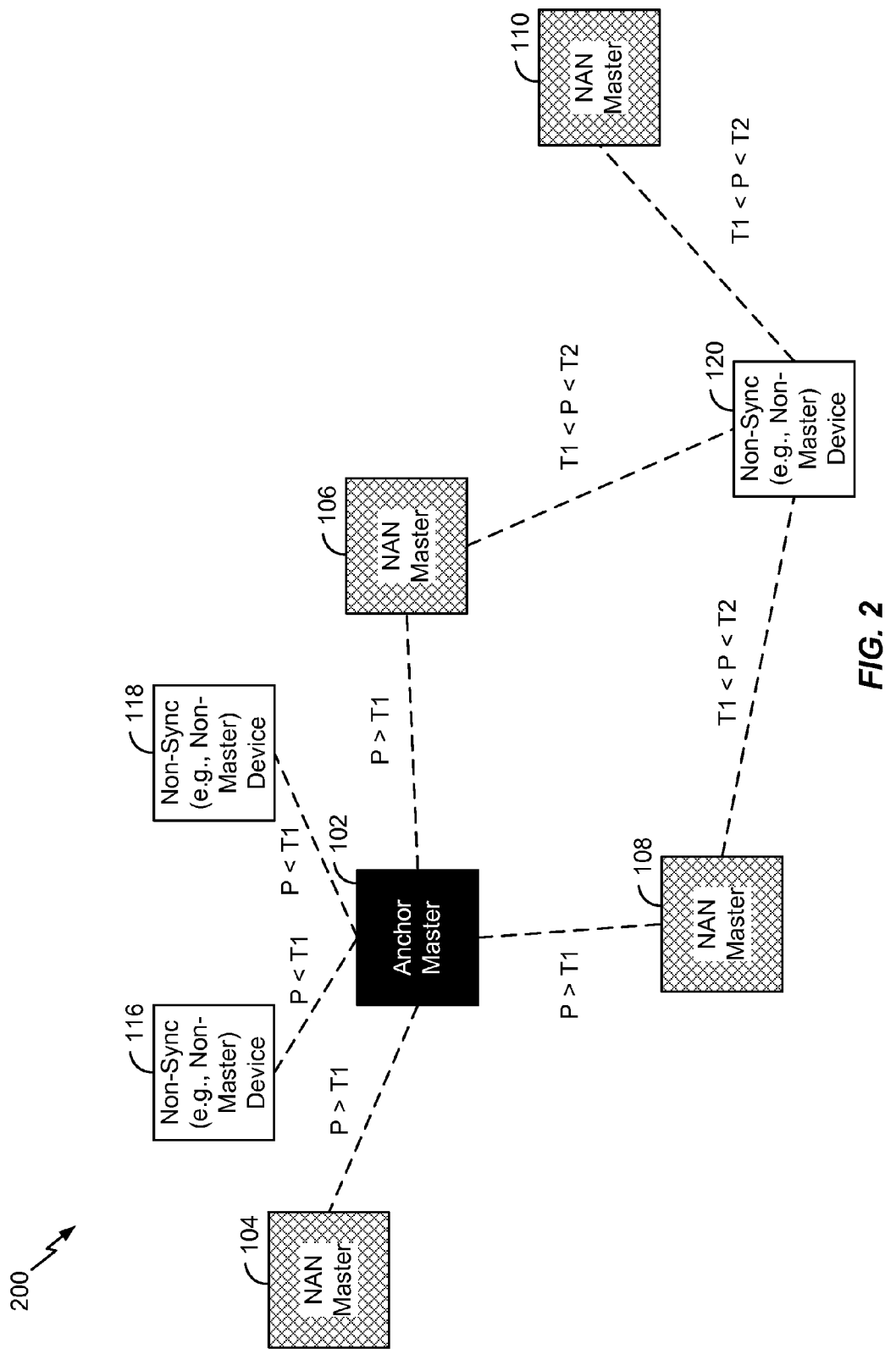
FIG. 2 is a diagram of a subset of the devices in the NAN of FIG. 1.

Referring to FIG. 2, a particular aspect of a system 200 that illustrates multiple proximity measurements and NAN operating modes of devices is shown. The system 200 includes the anchor master device 102, the NAN master devices 104-110, and the non-master non-sync devices 116-120 of FIG. 1. In FIG. 2, the various devices of FIG. 1 are illustrated in a different arrangement than in FIG. 1. The arrangement is for illustration and is not limiting. In other aspects, the system 200 may include other devices (e.g., devices operating in other NAN operating modes) in other arrangements.

In FIG. 2, a proximity P of each device 102-110 and 116-120 is labeled in relationship to a first proximity threshold T1 and a second proximity threshold T2. T1 corresponds to the first proximity threshold tclose (e.g., the first proximity threshold 160 of FIG. 1) and T2 corresponds to the second proximity threshold tmedium (e.g., the second proximity threshold 162 of FIG. 1).

During operation, the anchor master device 102 may determine to operate in the anchor master operating mode in accordance with a NAN standard. The NAN master devices 104-108 may determine to operate in the master device operating mode based on a corresponding proximity to the anchor master device 102. For example, because the proximity of each of the NAN master devices 104-108 to the anchor master device 102 exceeds the first threshold T1, the NAN master devices 104-108 may determine to operate in the master operating mode (e.g., may not change the NAN operating modes from the master device operating mode to the non-master device operating modes). The non-master non-sync devices 116 and 118 may determine to operate in a non-master device operating mode based on a corresponding proximity to the anchor master device 102. For example, because the proximity of each of the non-master non-sync devices 116 and 118 to the anchor master device 102 fails to exceed the first threshold T1, the non-master non-sync devices 116 and 118 may determine to operate in the non-master non-sync operating mode (e.g., may not change the NAN operating modes from the non-master non-sync operating mode to one of the master device operating modes).

The non-master non-sync device 120 may determine to operate in a non-master device operating mode based on a proximity to the NAN master devices 106-110. For example, because the proximity of the non-master non-sync device 120 to the NAN master devices 106-110 exceeds the first threshold T1 and fails to exceed the second threshold T2, the non-master non-sync device 120 may determine to operate in a non-master operating mode (e.g., may not change the NAN operating modes from the non-master non-sync operating mode to one of the master device operating modes). Accordingly, a device may operate in a non-master operating mode if a proximity to a closest NAN master device exceeds the first proximity threshold T1 if the proximity to at least three NAN master devices is between the first threshold T1 and the second threshold T2.

Thus, each of the devices 102-110 and 116-120 in the system 200 may determine whether to change NAN operating modes based at least on proximity to one or more NAN master devices. Determining whether to change NAN operating modes based at least on proximity may improve a NAN cluster topology as compared to determining whether to change NAN operating modes based only on received signal strength.

Figure 3:
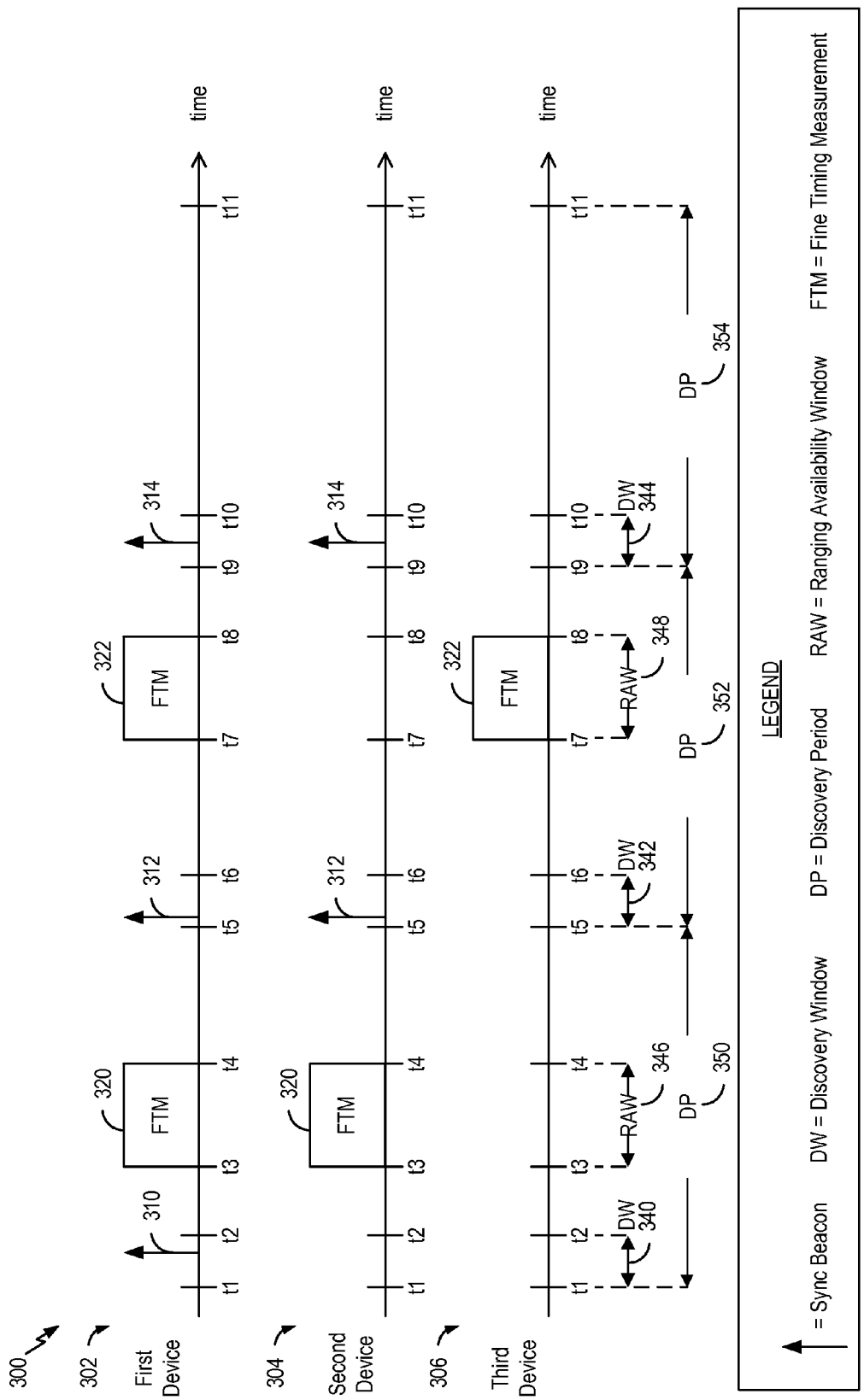
FIG. 3 is a diagram illustrating operation at the system of FIG. 1.

FIG. 3 illustrates operation at the system 100 and is generally designated 300. In FIG. 3, NAN device operation associated with a first device 302, a second device 304, and a third device 306 is illustrated along horizontal axes representing time.

As shown in FIG. 3, the first device 302 may operate as an anchor master device or a NAN master device (e.g., operate in an anchor master device operating mode or a NAN master device operating mode) from time t1 through time t11 and periodically transmit sync beacons 310-314. For example, the first device 302 may transmit a first sync beacon 310 between times t1 and t2, a second sync beacon 312 between times t5 and t6, and a third sync beacon 314 between times t9 and t10. The first device 302 may transmit each of the sync beacons 310-314 during a discovery window of the NAN. For example, the first sync beacon 310 may be transmit during a first discovery window (DW) 340 of a first discovery period (DP) 350, the second sync beacon 312 may be transmit during a second DW 342 of a second DP 352, and the third sync beacon 314 may be transmit during a third DW 344 of a third DP 354. Each of the sync beacons 310-314 may provide synchronization information used by other devices in the NAN to synchronize respective internal clocks.

Additionally, the sync beacons 310-314 may include RAW indicators that indicate a ranging availability window (RAW) (e.g., a time period) reserved by the first device 302 for performing proximity determination operations. The RAW indicators may correspond to the RAW indicator 158 of FIG. 1. For example, the first sync beacon 310 may include a RAW indicator that indicates a first ranging availability window (RAW) 346 scheduled during the first DP 350. The first device 302 may schedule the first RAW 346 at any time after the first DW 340 and during the first DP 350. For example, the first device 302 may schedule the first RAW 346 between time t3 and time t4. The first device 302 may reserve the duration of the first RAW 346 for performing proximity determination operations (e.g., fine timing measurements (FTMs)) with other devices of the NAN. The second sync beacon 312 may include a RAW indicator that indicates a second RAW 348 scheduled during the second DP 352, and the third sync beacon 314 may include a RAW indicator that indicates that no RAW is scheduled during the third DP 354.

The second device 304 may initially operate in the non-master device operating mode at time t1. During the first DW 340, the second device 304 may receive the first sync beacon 310 and determine a time of the first RAW 346. During the first RAW 346, the second device 304 may initiate FTMs 320 with the first device 302. The FTMs 320 may be similar to the proximity determination operations 142 of FIG. 1. For example, the second device 304 may determine a proximity to the first device 302 using the FTMs 320. After determining the proximity, the second device 304 may determine whether to change a NAN operating mode from the non-master device operating mode to the master device operating mode based on the proximity. In the example illustrated in FIG. 3, the proximity of the second device 304 to the first device 302 exceeds a first proximity threshold (e.g., tclose). Because the proximity exceeds the first proximity threshold, the second device 304 changes the NAN operating mode from the non-master device operating mode to the master device operating mode. Accordingly, the second device 304 may propagate (e.g., transmit) the second sync beacon 312 during the second DW 342 and propagate the third sync beacon 314 during the third DW 344.

The third device 306 may join the NAN prior to time t5 and may initially operate in the non-master device operating mode. During the second DW 342, the third device 306 may receive the second sync beacon 312 and determine a time of the second RAW 348. During the second RAW 348, the third device 306 may initiate FTMs 322 with the first device 302. The FTMs 322 may be similar to the proximity determination operations 142 of FIG. 1. For example, the third device 306 may determine a proximity to the first device 302 using the FTMs 322. After determining the proximity, the third device 306 may determine whether to change a NAN operating mode from the non-master device operating mode to the master device operating mode based on the proximity. In the example illustrated in FIG. 3, the proximity of the third device 306 to the first device 302 fails to exceed a first proximity threshold (e.g., tclose). Because the proximity fails to exceed the first proximity threshold, the third device 306 remains operating in the non-master device operating mode. Accordingly, the third device 306 does not propagate (e.g., transmit) the third sync beacon 314 during the third DW 344.

Figure 4:
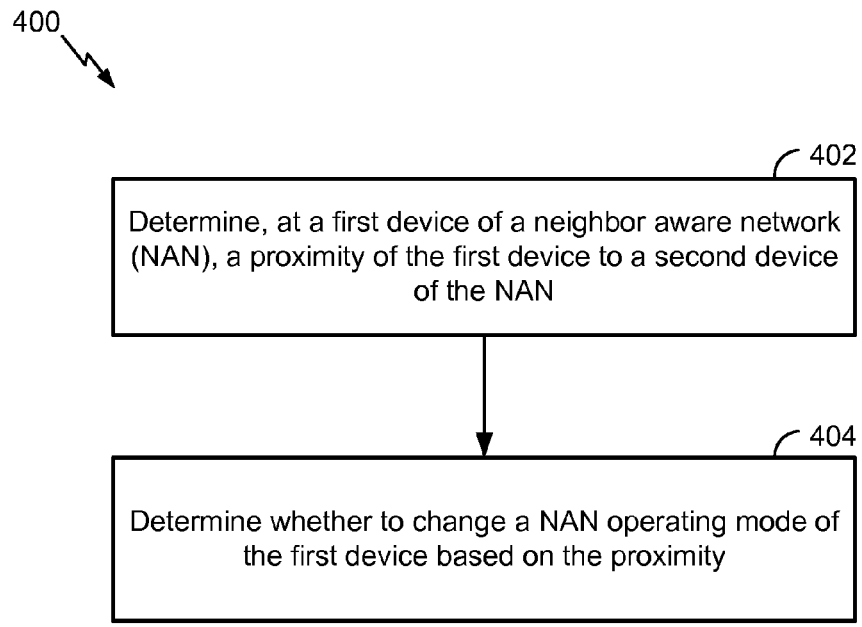
FIG. 4 is a flow diagram of a first illustrative method of operation at a device of a NAN.

Referring to FIG. 4, a first aspect of a method 400 of operation at a device of a NAN is shown. The method 400 may be performed at any of the devices 102-126 of FIG. 1, the devices 102-110 and 116-120 of FIG. 2, the devices 302-306 of FIG. 3, or at other devices of a NAN. In a particular aspect, the method 400 is performed at the first device 126 of FIG. 1 or the second device 304 or the third device 306 of FIG. 3.

The method 400 includes determining, at a first device of a NAN, a proximity of the first device to a second device of the NAN, at 402. For example, the first device 126 may determine a proximity of the first device 126 to the NAN master device 108 by performing the proximity determination operations 142. In a particular implementation, the method 400 may include performing one or more fine timing measurements (FTMs) to determine the proximity. For example, the first device 126 may perform one or more fine timing measurements (FTMs) to determine the proximity of the first device 126 to the NAN master device 108, as described with reference to FIG. 1.

The method 400 further includes determining whether to change a NAN operating mode of the first device based on the proximity, at 404. For example, in FIG. 1, the NAN operating mode selection logic 150 of the first device 126 may determine whether to change a NAN operating mode of the first device 126 based on the proximity (indicated by the proximity data 152). In a particular implementation, the NAN operating mode of the first device is changed between a master device operating mode and a non-master non-sync device operating mode.

In a particular implementation, the method 400 includes determining whether to change the NAN operating mode of the first device based further on a RSSI associated with a transmission received from the second device. For example, in FIG. 1, the NAN operating mode selection logic 150 may determine whether to change the NAN operating mode of the first device 126 based further on the RSSI 154 associated with the beacon message 140. In a particular implementation, determining whether to change the NAN operating mode of the first device based on the proximity may occur prior to determining whether to change the NAN operating mode of the first device based on the RSSI. For example, in FIG. 1, determining whether to change the NAN operating mode of the first device 126 based on the proximity (indicated by the proximity data 152) may occur prior to determining whether to change the NAN operating mode based on the RSSI 154. In an alternate implementation, determining whether to change the NAN operating mode of the first device based on the proximity may occur subsequent to determining whether to change the NAN operating mode of the first device based on the RSSI. For example, in FIG. 1, determining whether to change the NAN operating mode of the first device 126 based on the proximity (indicated by the proximity data 152) may occur subsequent to determining whether to change the NAN operating mode based on the RSSI 154.

In a particular implementation, the method 400 further includes determining whether to change the NAN operating mode of the first device from the non-master device operating mode to the master device operating mode based on the RSSI and determining whether to change the NAN operating mode of the first device from the master device operating mode to the non-master device operating mode based on the proximity. For example, in FIG. 1, the NAN operating mode selection logic 150 of the first device 126 may determine whether to change the NAN operating mode from the non-master device operating mode to the master device operating mode based on the RSSI 154 and may determine whether to change the NAN operating mode from the master device operating mode to the non-master device operating mode based on the proximity (indicated by the proximity data 152). The first device may terminate one or more master device operations prior to changing the NAN operating mode to the non-master device operating mode and may initiate the one or more master device operations upon changing the NAN operating mode to the master device operating mode, as described with reference to FIG. 1.

In another implementation, the method 400 further includes determining whether to change the NAN operating mode of the first device from the non-master device operating mode to the master device operating mode based on the proximity and determining whether to change the NAN operating mode of the first device from the master device operating mode to the non-master device operating mode based on the RSSI. For example, in FIG. 1, the NAN operating mode selection logic 150 of the first device 126 may determine whether to change the NAN operating mode from the non-master device operating mode to the master device operating mode based on the proximity (indicated by the proximity data 152) and may determine whether to change the NAN operating mode from the master device operating mode to the non-master device operating mode based on the RSSI 154.

In a particular implementation, the method 400 further includes determining whether to change the NAN operating mode of the first device from the master device operating mode to the non-master device operating mode based on the proximity and based on the RSSI. For example, in FIG. 1, the NAN operating mode selection logic 150 of the first device 126 may determine whether to change the NAN operating mode from the master device operating mode to the non-master device operating mode based on the proximity (indicated by the proximity data 152) and based on the RSSI 154.

Additionally or alternatively, the method 400 further includes determining whether to change the NAN operating mode of the first device from the non-master device operating mode to the master device operating mode based on the proximity and the RSSI. For example, in FIG. 1, the NAN operating mode selection logic 150 of the first device 126 may determine whether to change the NAN operating mode from the non-master device operating mode to the master device operating mode based on the proximity (indicated by the proximity data 152) and based on the RSSI 154.

In a particular implementation, the method 400 further includes changing the NAN operating mode from the master device operating mode to the non-master device operating mode based on the proximity failing to exceed a first proximity threshold. For example, in FIG. 1, the NAN operating mode selection logic 150 may change the NAN operating mode of the first device 126 from the master device operating mode to the non-master device operating mode if the proximity (indicated by the proximity data 152) fails to exceed the first proximity threshold 160 (tclose) of the one or more proximity thresholds 156. The second device may perform one or more master device operations. For example, the second device may be the NAN master device 108 of FIG. 1 that performs one or more master device operations (e.g., that operates in the master device operating mode).

Additionally or alternatively, the method 400 further includes determining whether a proximity of the first device to three other devices of the NAN exceeds the first proximity threshold and fails to exceed a second proximity threshold. For example, the non-master non-sync device 120 of FIG. 2 may determine whether the proximity of the non-master non-sync device 120 to the three NAN master devices 106-110 exceeds the first proximity threshold t1 (e.g., the first proximity threshold 160) and fails to exceed the second proximity threshold t2 (e.g., the second proximity threshold 162). Each of the three other devices may perform one or more master device operations. For example, each of the three other devices may be NAN master devices operating in the master device operating mode, as described with reference to FIGS. 1 and 2. The method 400 may further include determining the proximity of the first device to the three other devices and changing the NAN operating mode of the first device from the master device operating mode to the non-master device operating mode based on the proximity of the first device to the three other devices exceeding the first proximity threshold and failing to exceed the second proximity threshold. For example, the non-master non-sync device 120 of FIG. 2 may determine to change the NAN operating mode to the non-master device operating mode if the proximity of the non-master non-sync device 120 to the three NAN master devices 106-110 exceeds the first proximity threshold t1 (e.g., the first proximity threshold 160) and fails to exceed the second proximity threshold t2 (e.g., the second proximity threshold 162).

In a particular implementation, the method 400 further includes changing the NAN operating mode from a non-master sync device operating mode to a non-master non-sync device operating mode based on the proximity failing to exceed a first proximity threshold. For example, in FIG. 1, the NAN operating mode selection logic 150 may change the NAN operating mode of the first device 126 from the non-master sync device operating mode to the non-master non-sync device operating mode if the proximity (indicated by the proximity data 152) fails to exceed the first proximity threshold 160 of the one or more proximity thresholds 156. The method 400 may further include changing the NAN operating mode from the non-master non-sync device operating mode to the non-master sync device operating mode based on the proximity exceeding the first proximity threshold. For example, in FIG. 1, the NAN operating mode selection logic 150 may change the NAN operating mode of the first device 126 from the non-master non-sync device operating mode to the non-master sync device operating mode if the proximity (indicated by the proximity data 152) exceeds the first proximity threshold 160 of the one or more proximity thresholds 156.

In a particular implementation, the method 400 further includes changing the NAN operating mode from the non-master sync device operating mode to the non-master non-sync device operating mode based on proximities of the first device to three or more other devices of the NAN exceeding a first proximity threshold and failing to exceed a second proximity threshold. For example, in FIG. 1, the NAN operating mode selection logic 150 may change the NAN operating mode of the first device 126 from the non-master sync device operating mode to the non-master non-sync device operating mode if proximities of the first device 126 to three or more other devices operating in the sync device operating mode exceed the first proximity threshold 160 of the one or more proximity thresholds 156 and fail to exceed the second proximity threshold 162 of the one or more proximity thresholds 156. The method 400 may further include changing the NAN operating mode from the non-master non-sync device operating mode to the non-master sync device operating mode based on proximities of the first device to less than three other devices of the NAN exceeding the first proximity threshold and failing to exceed the second proximity threshold. For example, in FIG. 1, the NAN operating mode selection logic 150 may change the NAN operating mode of the first device 126 from the non-master non-sync device operating mode to the non-master sync device operating mode if proximities of the first device 126 to less than three other devices operating in the sync device operating mode exceed the first proximity threshold 160 of the one or more proximity thresholds 156 and fail to exceed the second proximity threshold 162 of the one or more proximity thresholds 156.

In a particular implementation, the method 400 further includes changing the NAN operating mode of the first device from the non-master device operating mode to the master device operating mode based on the proximity exceeding a first proximity threshold. For example, in FIG. 1, the NAN operating mode selection logic 150 may change the NAN operating mode of the first device 126 from the non-master device operating mode to the master device operating mode if the proximity (indicated by the proximity data 152) fails to exceed the first proximity threshold 160 of the one or more proximity thresholds 156.

In a particular implementation, the method 400 further includes receiving a discovery beacon message at the first device from the second device. The discovery beacon message may indicate a ranging availability window (RAW) (e.g., a time period) reserved by the second device for performing proximity determination operations. For example, in FIG. 1, the first device 126 may receive the beacon message 140 including the RAW indicator 158 indicating the RAW (e.g., the time period) for performing the proximity determination operations 142. The method 400 may further include determining the proximity by initiating, at the first device, one or more proximity determination operations with the second device during the time period. For example, in FIG. 1, the first device 126 may determine the proximity to the NAN master device 108 by initiating the proximity determination operations 142 during the RAW (e.g., the time period) indicated by the RAW indicator 158. Additionally, determining whether to change the NAN operating mode of the first device may be based on comparing the proximity to one or more proximity thresholds indicated by the discovery beacon message. For example, in FIG. 1, the first device 126 may determine whether to change the NAN operating mode based on comparing the proximity (indicated by the proximity data 152) to the one or more proximity thresholds 156 included in the beacon message 140.

In another implementation, the method 400 further includes receiving a synchronization beacon message at the first device from the second device. The synchronization beacon message may indicate a time period reserved by the second device for performing proximity determination operations, one or more proximity thresholds, or a combination thereof. For example, in FIG. 3, the second device 304 may receive the first sync beacon 310 indicating a time period of first RAW 346, one or more proximity thresholds (e.g., the one or more proximity thresholds 156), or a combination thereof.

In a particular implementation, determining whether to change the NAN operating mode of the first device may be based on comparing the proximity to one or more proximity thresholds stored at the first device. For example, in FIG. 1, the one or more proximity thresholds 156 may be stored (e.g., pre-programmed) in the first device 126 instead of received via the beacon message 140. In another particular implementation, the method 400 further includes transmitting information indicating the proximity from the first device to the second device. For example, in FIG. 1, the first device 126 transmits the proximity data 152 to the NAN master device 108.

Figure 5:
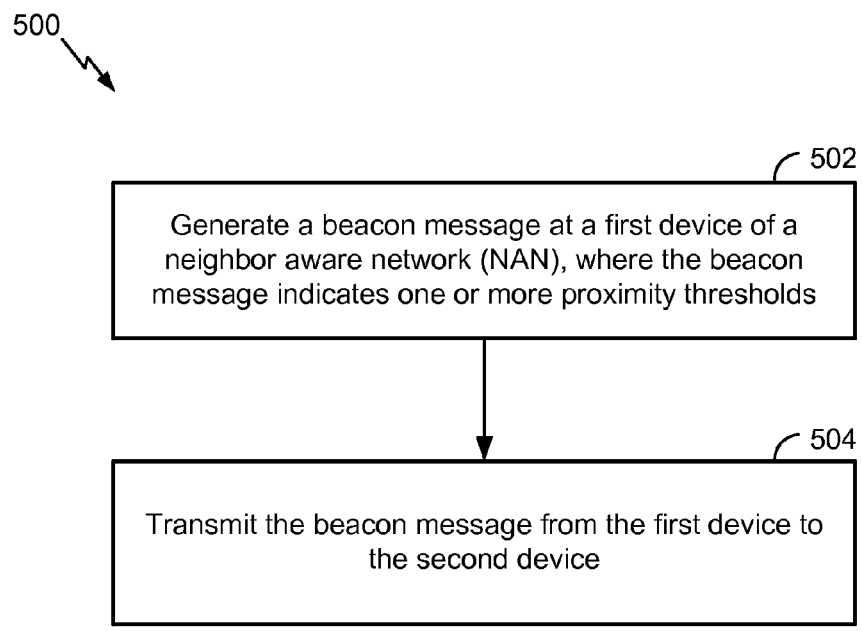
FIG. 5 is a flow diagram of a second illustrative method of operation at a device of a NAN.

Referring to FIG. 5, a second aspect of a method 500 of operation at a device of a NAN is shown. The method 500 may be performed at any of the devices 102-126 of FIG. 1, the devices 102-110 and 116-120 of FIG. 2, the devices 302-306 of FIG. 3, or at other devices of a NAN. In a particular aspect, the method 500 is performed at the NAN master device 108 of FIG. 1 or the first device 302 of FIG. 3.

The method 500 includes generating a beacon message at a first device of a NAN, at 502. The beacon message may indicate one or more proximity thresholds. For example, in FIG. 1, the NAN master device 108 may generate the beacon message 140 including the one or more proximity thresholds 156.

The method 500 further includes transmitting the beacon message from the first device to a second device of the NAN, at 504. For example, in FIG. 1, the NAN master device 108 transmits the beacon message 140 to the first device 126.

The one or more proximity thresholds may enable the second device to determine whether to change a NAN operating mode of the second device based on a proximity of the second device to the first device and based on the one or more proximity thresholds. For example, in FIG. 1, the one or more proximity thresholds 156 may enable the first device 126 to change the NAN operating mode of the first device 126 based on comparing of the proximity (indicated by the proximity data 152) to the one or more proximity thresholds 156 (e.g., the first proximity threshold 160 and the second proximity threshold 162). To illustrate, the first device 126 may change the NAN operating mode from the master device operating mode to a non-master device operating mode (e.g., the non-master synch operating mode or the non-master non-sync operating mode) when the proximity fails to exceed the first proximity threshold 160 (tclose) of the one or more proximity thresholds 156.

Figure 6:
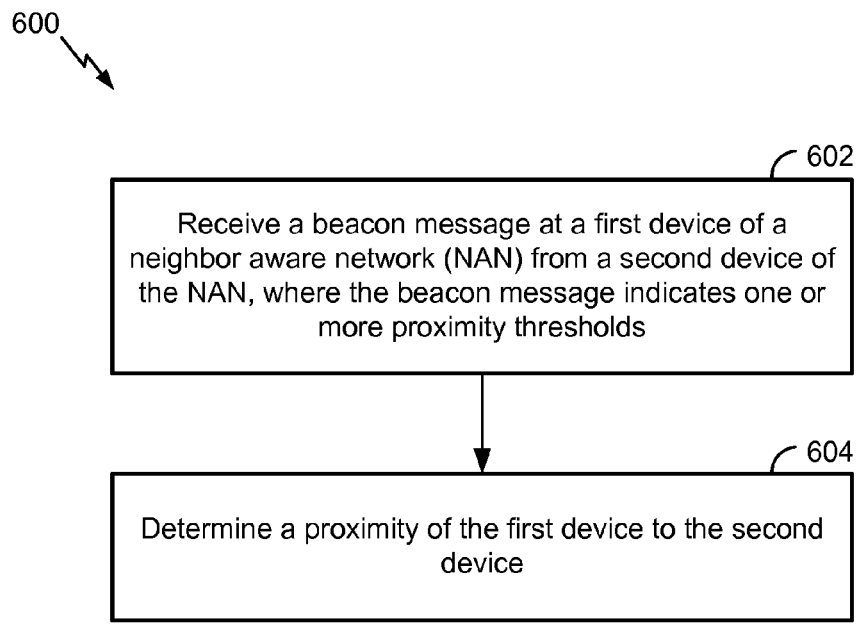
FIG. 6 is a flow diagram of a third illustrative method of operation at a device of a NAN.

Referring to FIG. 6, a third aspect of a method 600 of operation at a device of a NAN is shown. The method 600 may be performed at any of the devices 102-126 of FIG. 1, the devices 102-110 and 116-120 of FIG. 2, the devices 302-306 of FIG. 3, or at other devices of a NAN. In a particular aspect, the method 600 is performed at the first device 126 of FIG. 1.

The method 600 includes receiving a beacon message at a first device of a NAN from a second device of the NAN, at 602. The beacon message may indicate one or more proximity thresholds. For example, in FIG. 1, the first device 126 may receive the beacon message 140 from the NAN master device 108. The beacon message 140 may indicate the one or more proximity thresholds 156.

The method 600 further includes determining a proximity of the first device to the second device, at 604. For example, the first device 126 may determine a proximity of the first device 126 to the NAN master device 108 via the proximity determination operations 142 and may store the proximity as the proximity data 152. Performing the proximity determination operations 142 may include performing one or more fine timing measurements (FTMs).

In a particular implementation, the method 600 further includes determining whether to change a NAN operating mode of the first device based on comparing the proximity to the one or more proximity thresholds. For example, in FIG. 1, the NAN operating mode selection logic 150 of the first device 126 may determine whether to change the NAN operating mode based on comparing the proximity (indicated by the proximity data 152) to the one or more proximity thresholds 156 (e.g., the first proximity threshold 160 and the second proximity threshold 162).

Figure 7:
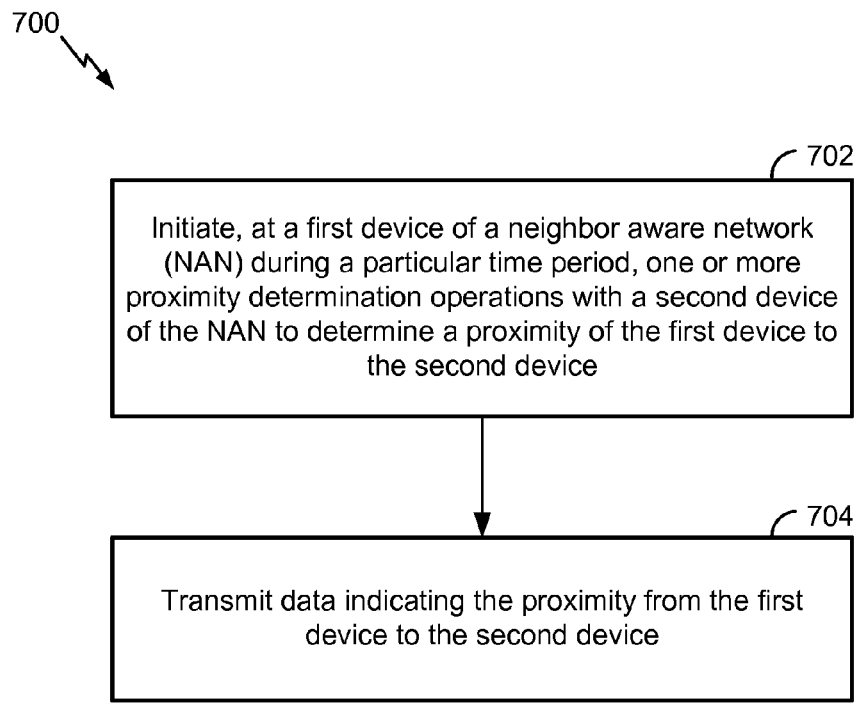
FIG. 7 is a flow diagram of a fourth illustrative method of operation at a device of a NAN.

Referring to FIG. 7, a fourth aspect of a method 700 of operation at a device of a NAN is shown. The method 700 may be performed at any of the devices 102-126 of FIG. 1, the devices 102-110 and 116-120 of FIG. 2, the devices 302-306 of FIG. 3, or at other devices of a NAN. In a particular aspect, the method 700 is performed at the first device 126 of FIG. 1.

The method 700 includes initiating, at a first device of a NAN during a particular time period, one or more proximity determination operations with a second device of the NAN to determine a proximity of the first device to the second device, at 702. For example, in FIG. 1, the first device 126 may initiate the proximity determination operations 142 with the NAN master device 108 to determine proximity of the first device 126 to the NAN master device 108. The proximity determination operations 142 may be initiated by the first device 126 during a RAW (e.g., a particular time period) indicated by the RAW indicator 158 included in the beacon message 140. The proximity determination operations 142 may include one or more fine timing measurements (FTMs).

The method 700 further includes transmitting data indicating the proximity from the first device to the second device, at 704. For example, in FIG. 1, the first device 126 stores the proximity of the first device 126 to the NAN master device 108 as the proximity data 152 and transmits the proximity data 152 to the NAN master device 108.

In a particular implementation, the method 700 further includes receiving a beacon message at the first device from the second device. The particular time period may be indicated by the beacon message, and the beacon message may further indicate one or more proximity thresholds. For example, in FIG. 1, the first device 126 may receive the beacon message 140 from the NAN master device 108. The beacon message 140 may include the RAW indicator 158 and the one or more proximity thresholds 156.

Figure 8:
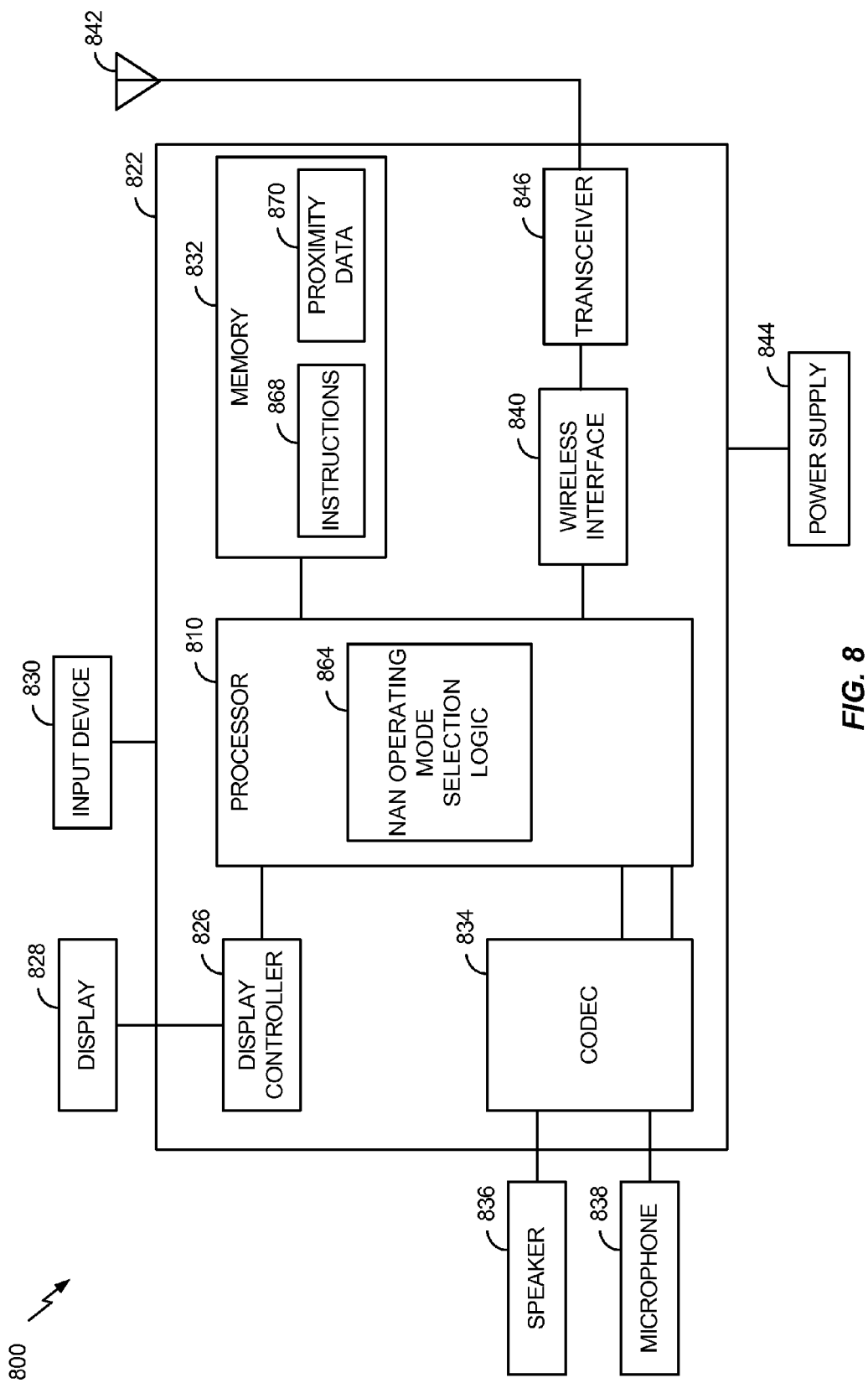
FIG. 8 is a diagram of a wireless device that is operable to support various aspects of one or more methods, systems, apparatuses, and/or computer-readable media disclosed herein.

Referring to FIG. 8, a particular illustrative aspect of a wireless communication device is depicted and generally designated 800. The device 800 includes a processor 810, such as a digital signal processor, coupled to a memory 832. In an illustrative aspect, the device 800, or components thereof, may correspond to the devices 102-126 of FIG. 1, the devices 102-110 and 116-120 of FIG. 2, the devices 302-306 of FIG. 3, or components thereof.

The processor 810 may be configured to execute software (e.g., a program of one or more instructions 868) stored in the memory 832. Additionally or alternatively, the processor 810 may be configured to implement one or more instructions stored in a memory of a wireless interface 840 (e.g., an IEEE 802.11 interface). For example, the wireless interface 840 may be configured to operate in accordance with one or more wireless communication standards, including a NAN standard. In a particular implementation, the processor 810 may be configured to operate in accordance with one or more of the methods of FIGS. 4-7. For example, the processor 810 may include NAN operating mode selection logic 864 to execute one or more of the methods of FIGS. 4-7. In a particular implementation, the NAN operating mode selection logic 864 may correspond to the NAN operating mode selection logic 150 of FIG. 1. The processor 810 may also be configured to determine and store proximity data 870 for the device 800. In an illustrative implementation, the proximity data 870 may a proximity of the device 800 to another device operating in an anchor master operating mode or a NAN master operating mode.

The wireless interface 840 may be coupled to the processor 810 and to an antenna 842. For example, the wireless interface 840 may be coupled to the antenna 842 via a transceiver 846, such that wireless data received via the antenna 842 and may be provided to the processor 810.

A coder/decoder (CODEC) 834 can also be coupled to the processor 810. A speaker 836 and a microphone 838 can be coupled to the CODEC 834. A display controller 826 can be coupled to the processor 810 and to a display device 828. In a particular implementation, the processor 810, the display controller 826, the memory 832, the CODEC 834, and the wireless interface 840 are included in a system-in-package or system-on-chip device 822. In a particular implementation, an input device 830 and a power supply 844 are coupled to the system-on-chip device 822. Moreover, in a particular implementation, as illustrated in FIG. 8, the display device 828, the input device 830, the speaker 836, the microphone 838, the antenna 842, and the power supply 844 are external to the system-on-chip device 822. However, each of the display device 828, the input device 830, the speaker 836, the microphone 838, the antenna 842, and the power supply 844 can be coupled to one or more components of the system-on-chip device 822, such as one or more interfaces or controllers.

In conjunction with the described aspects, a first apparatus includes means for determining, at a first device of a NAN, a proximity of the first device to a second device of the NAN. For example, the means for determining may include the first device 126 of FIG. 1, the wireless interface 840, the processor 810 programmed to execute the instructions 868 of FIG. 8, one or more other devices, circuits, modules, or instructions to determine a proximity of a first device of a NAN to a second device of the NAN, or any combination thereof.

The first apparatus also includes means for determining whether to change a NAN operating mode of the first device based on the proximity. For example, the means for determining may include the NAN operating mode selection logic 150 of FIG. 1, the processor 810 programmed to execute the instructions 868, the NAN operating mode selection logic 864 of FIG. 8, one or more other devices, circuits, modules, or instructions to determine whether to change a NAN operating mode of a first device based on a proximity, or any combination thereof.

In conjunction with the described aspects, a second apparatus includes means for generating a beacon message at a first device of a NAN. The beacon message may indicate one or more proximity thresholds. For example, the means for generating may include the anchor master device 102 or the NAN master devices 104-110 of FIGS. 1 and 2, the first device 302 or the second device 304 of FIG. 3, the processor 810 programmed to execute the instructions 868 of FIG. 8, one or more other devices, circuits, modules, or instructions to generate a beacon message at a first device of a NAN, or any combination thereof.

The second apparatus also includes means for transmitting the beacon message from the first device to a second device of the NAN. For example, the means for transmitting may include the anchor master device 102 or the NAN master devices 104-110 of FIGS. 1 and 2, the first device 302 or the second device 304 of FIG. 3, the wireless interface 840, the processor 810 programmed to execute the instructions 868 of FIG. 8, one or more other devices, circuits, modules, or instructions to selectively transmit a beacon message from a first device of a NAN to a second device of the NAN, or any combination thereof.

In conjunction with the described aspects, a third apparatus includes means for receiving a beacon message at a first device of a NAN from a second device of the NAN. The beacon message may indicate one or more proximity thresholds. For example, the means for receiving may include the first device 126 of FIG. 1, the second device 304 or the third device 306 of FIG. 3, the wireless interface 840, the processor 810 programmed to execute the instructions 868 of FIG. 8, one or more other devices, circuits, modules, or instructions to receive a beacon message at a first device of NAN from a second device of the NAN, or any combination thereof.

The third apparatus also includes means for determining a proximity of the first device to the second device. For example, the means for determining may include the first device 126 of FIG. 1, the second device 304 or the third device 306 of FIG. 3, the processor 810 programmed to execute the instructions 868, the NAN operating mode selection logic 864 of FIG. 8, one or more other devices, circuits, modules, or instructions to determine a proximity of a first device of a NAN to a second device of the NAN, or any combination thereof.

In conjunction with the described aspects, a fourth apparatus includes means for initiating, at a first device of a NAN during a particular time period, one or more proximity determination operations with a second device of the NAN to determine a proximity of the first device to the second device. For example, the means for initiating may include the first device 126 of FIG. 1, the second device 304 or the third device 306 of FIG. 3, the processor 810 programmed to execute the instructions 868, the NAN operating mode selection logic 864 of FIG. 8, one or more other devices, circuits, modules, or instructions to initiate, at a first device of a NAN during a particular time period, one or more proximity determination operations with a second device of the NAN, or any combination thereof.

The fourth apparatus also includes means for transmitting data indicating the proximity from the first device to the second device. For example, the means for transmitting may include the first device 126 of FIG. 1, the wireless interface 840, the processor 810 programmed to execute the instructions 868 of FIG. 8, one or more other devices, circuits, modules, or instructions to selectively transmit data indicating the proximity from a first device of a NAN to a second device of the NAN, or any combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method comprising:
    receiving a message at a first device of a wi-fi neighbor aware network (NAN) from a second device of the wi-fi NAN, wherein the message identifies a ranging window with respect to a scheduled communication between the first device and the second device during a discovery period (DP) associated with the wi-fi NAN;
    determining, at the first device of the wi-fi NAN during the ranging window, a value representing an estimated distance from the first device to the second device of the wi-fi NAN; and
    determining whether to change a wi-fi NAN synchronization mode of the first device based on a comparison of the value to one or more proximity thresholds.

2. The method of claim 1, wherein the wi-fi NAN synchronization mode comprises an Institute of Electrical and Electronics Engineers (IEEE) 802.11 standard compliant synchronization mode, and wherein the one or more proximity thresholds comprises a first threshold corresponding to a first value representing a first distance, a second threshold corresponding to a second value representing a second distance, and a third threshold corresponding to a third value representing a third distance, wherein the first value is greater than the second value, wherein the second value is greater than the third value, and further comprising:
    performing one or more fine timing measurements (FTMs) to determine the value;
    retrieving the one or more proximity thresholds from a memory storing the one or more proximity thresholds;
    comparing the value to the first threshold; and
    after comparing the value to the first threshold and in response to the value exceeding the first threshold, comparing the value to the second threshold.

3. The method of claim 1, further comprising:
    receiving, at the first device, the one or more proximity thresholds;
    comparing the value to a first threshold of the one or more proximity thresholds; and
    changing the wi-fi NAN synchronization mode of the first device from a master device operating mode to a non-master device operating mode in response to the value failing to exceed the first threshold.

4. The method of claim 1, further comprising determining whether to change the wi-fi NAN synchronization mode of the first device based further on a received signal strength indicator (RSSI) associated with a transmission received from the second device.

5. The method of claim 1, further comprising:
    determining whether to change the wi-fi NAN synchronization mode of the first device from a non-master device synchronization mode to a master device synchronization mode based on a received signal strength indicator (RSSI) corresponding to a transmission received from the second device; and
    determining whether to change the wi-fi NAN synchronization mode of the first device from the master device synchronization mode to the non-master device synchronization mode based on the value.

6. The method of claim 5, further comprising:
    terminating one or more master device operations prior to changing the wi-fi NAN synchronization mode to the non-master device synchronization mode; and
    initiating the one or more master device operations upon changing the wi-fi NAN synchronization mode to the master device synchronization mode.

7. The method of claim 1, further comprising:
    determining whether to change the wi-fi NAN synchronization mode of the first device from a non-master device synchronization mode to a master device synchronization mode based on the value and based on a received signal strength indicator (RSSI) corresponding to a transmission received from the second device; and changing the wi-fi NAN operating mode of the first device from the master device synchronization mode to the non-master device synchronization mode in response to the value failing to exceed at least one of the one or more proximity thresholds and based on the RSSI failing to exceed at least one of one or more signal strength thresholds.

8. The method of claim 1, further comprising determining whether to change the wi-fi NAN synchronization mode of the first device from a master device operating mode to a non-master device synchronization mode based on the value and based on a received signal strength indicator (RSSI) corresponding to a transmission received from the second device at the first device.

9. The method of claim 1, further comprising determining whether to change the wi-fi NAN synchronization mode of the first device from a non-master device synchronization mode to a master device synchronization mode based on the value and based on a received signal strength indicator (RSSI) corresponding to a transmission received from the second device at the first device.

10. The method of claim 1, further comprising changing the wi-fi NAN operating mode from a master device synchronization mode to a non-master device synchronization mode based on the value failing to exceed a first proximity threshold, wherein the second device is configured to perform one or more master device operations.

11. The method of claim 1, further comprising:
determining a second value representing a second estimated distance of the first device with respect to a third device of the wi-fi NAN;
determining a third value representing a third estimated distance of the first device with respect to a fourth device of the wi-fi NAN; and
changing the wi-fi NAN synchronization mode of the first device from a master device synchronization mode to a non-master device synchronization mode based on the second value exceeding a first proximity threshold and failing to exceed a second proximity threshold and based on the third value exceeding the first proximity threshold and failing to exceed the second proximity threshold.

12. The method of claim 11, wherein the second device, the third device, and the fourth device perform one or more master device operations.

13. The method of claim 1, further comprising changing the wi-fi NAN synchronization mode from a non-master sync device operating mode to a non-master non-sync device synchronization mode based on the value failing to exceed a first proximity threshold.

14. The method of claim 1, further comprising changing the wi-fi NAN synchronization mode from a non-master non-sync device synchronization mode to a non-master sync device synchronization mode based on the value exceeding a first proximity threshold.

15. The method of claim 1, further comprising changing the wi-fi NAN synchronization mode from a non-master sync device synchronization mode to a non-master non-sync device synchronization mode based on a plurality of values representing estimated distances of the first device with respect to three or more other devices of the wi-fi NAN exceeding a first proximity threshold and failing to exceed a second proximity threshold.

16. The method of claim 1, further comprising changing the wi-fi NAN synchronization mode from a non-master non-sync device synchronization mode to a non-master sync device synchronization mode based on a plurality of values representing estimated distances of the first device with respect to less than three other devices of the wi-fi NAN exceeding a first proximity threshold and failing to exceed a second proximity threshold.

17. The method of claim 1, further comprising changing the wi-fi NAN synchronization mode of the first device from a non-master device synchronization mode to a master device synchronization mode based on the value exceeding a first proximity threshold.

18. The method of claim 1, further comprising transmitting information indicating the value from the first device to the second device.

19. An apparatus comprising:
a processor;
an interface configured to receive a message at a first device of a wi-fi neighbor aware network (NAN) from a second device of the wi-fi NAN, wherein the message identifies a ranging window with respect to a scheduled communication between the first device and the second device during a discovery period (DP) associated with the wi-fi NAN; and
a memory coupled to the processor, wherein the memory stores instructions that are executable by the processor to cause the processor to:
determine, at the first device of a wi-fi neighbor aware network (NAN) during the ranging window, a value representing an estimated distance from the first device to the second device of the wi-fi NAN; and
determine whether to change a wi-fi NAN synchronization mode of the first device based on a comparison of the value to one or more proximity thresholds.

20. The apparatus of claim 19, wherein the message comprises a beacon message, wherein the beacon message indicates a time period reserved by the second device for receiving messages from the first device to enable the first device to determine the value, and wherein the beacon message further indicates one or more proximity thresholds.

21. The apparatus of claim 20, wherein the beacon message comprises a discovery beacon message or a synchronization beacon message.

22. The apparatus of claim 20, wherein the time period corresponds to the ranging window.

23. The apparatus of claim 20, wherein the instructions further cause the processor to:
initiate, at the first device, one or more measurements during the time period to determine the value; and
transmit data that indicates the value from the first device to the second device.

24. An apparatus comprising:
means for receiving a message at a first device of a wi-fi neighbor aware network (NAN) from a second device of the wi-fi NAN, wherein the message identifies a ranging window with respect to a scheduled communication between the first device and the second device during a discovery period (DP) associated with the wi-fi NAN;
means for determining, at the first device of the wi-fi NAN during the ranging window, a value representing an estimated distance from the first device to the second device of the wi-fi NAN; and means for determining whether to change a wi-fi NAN synchronization mode of the first device based on a comparison of the value to one or more proximity thresholds.

25. A non-transitory computer readable medium comprising instructions that, when executed by a processor, cause the processor to:
receive a message at a first device of a wi-fi neighbor aware network (NAN) from a second device of the wi-fi NAN, wherein the message identifies a ranging window with respect to a scheduled communication between the first device and the second device during a discovery period (DP) associated with the wi-fi NAN;
determine, at the first device of the wi-fi NAN during the ranging window, a value representing an estimated distance from the first device to the second device of the wi-fi NAN; and
determine whether to change a wi-fi NAN synchronization mode of the first device based on a comparison of the value to one or more proximity thresholds.

26. The non-transitory computer readable medium of claim 25, wherein the instructions, when executed by the processor, further cause the processor to:
generate a beacon message at the first device, wherein the beacon message indicates one or more proximity thresholds, a time period reserved by the first device for determining the value, or a combination thereof; and
transmit the beacon message from the first device to a third device of the wi-fi NAN.

27. The method of claim 1, wherein changing the wi-fi NAN synchronization mode of the first device comprises changing the wi-fi NAN synchronization mode from a first of at least three wi-fi NAN synchronization modes to a second of the at least three wi-fi NAN synchronization modes, and wherein the at least the three wi-fi NAN synchronization modes comprise a master wi-fi NAN synchronization mode, a sync non-master wi-fi NAN synchronization mode, and a non-sync non-master wi-fi NAN synchronization mode.

28. The method of claim 1, wherein a duration of the ranging window is based on a quantity of devices in the wi-fi NAN.

29. The method of claim 1, further comprising initiating a six frame exchange between the first device and the second device prior to determining the estimated distance.

30. The method of claim 29, wherein the six frame exchange comprises:
sending a fine timing measurement (FTM) request from the first device to the second device during the ranging window;
receiving a first FTM response from the second device at the first device;
sending an acknowledgment message from the first device to the second device; and
in response to sending the acknowledgment message, receiving a second FTM response at the first device from the second device, wherein the second FTM response includes data indicating a first time at which the second device sent the first FTM response and a second time at which the second device received the second FTM response.

31. The method of claim 30, further comprising:
determining the value based at least in part on the first time and the second time; and
changing the wi-fi NAN operating mode of the first device based on a result of the comparison of the value to one or more proximity thresholds.

* * * * *